(12) United States Patent
Palinski et al.

(10) Patent No.: US 11,243,159 B1
(45) Date of Patent: Feb. 8, 2022

(54) LARGE-AREA, ACTIVELY TUNABLE, ASYMMETRIC FABRY-PEROT CAVITIES FOR COLORIMETRIC SENSING AND OPTICAL SWITCHING

(71) Applicant: United States of America as represented by the Administrator of NASA, Washington, DC (US)

(72) Inventors: Timothy J. Palinski, Cleveland, OH (US); Gary W. Hunter, Cleveland, OH (US); John Zhang, Cleveland, OH (US)

(*) Notice: Subject to any disclaimer, the term of this patent is extended or adjusted under 35 U.S.C. 154(b) by 0 days.

(21) Appl. No.: 16/783,712

(22) Filed: Feb. 6, 2020

Related U.S. Application Data

(60) Provisional application No. 62/802,399, filed on Feb. 7, 2019.

(51) Int. Cl.
  G01N 21/00 (2006.01)
  G01N 21/27 (2006.01)
  G01N 21/29 (2006.01)

(52) U.S. Cl.
  CPC ........... *G01N 21/272* (2013.01); *G01N 21/29* (2013.01)

(58) Field of Classification Search
  CPC ... G01N 2021/7723; G01N 2021/7779; G01N 2021/7789; G01N 2021/7769; G01N 21/78; G01N 21/783; G01N 21/8422; G01N 21/77; G01N 21/55; G01N 33/525
  USPC ............... 356/234, 432–440, 445–448, 504; 436/166; 422/82.5, 68.1, 85, 86, 119, 422/82.09, 83, 88, 400, 426; 359/584, 359/885, 585
  See application file for complete search history.

(56) References Cited

U.S. PATENT DOCUMENTS

| | | | |
|---|---|---|---|
| 8,810,780 B1* | 8/2014 | Barcelo | G01L 1/241 356/33 |
| 2004/0184948 A1* | 9/2004 | Rakow | G01N 21/78 422/1 |
| 2010/0053598 A1* | 3/2010 | Kwon | G01B 11/16 356/32 |
| 2011/0168257 A1* | 7/2011 | Kochergin | H01L 31/02168 136/258 |
| 2016/0003744 A1* | 1/2016 | Chou | G01N 21/6486 435/5 |

(Continued)

*Primary Examiner* — Hoa Q Pham
(74) *Attorney, Agent, or Firm* — Robert H. Earp, III; Mark Wolfgang; Helen M. Galus

(57) ABSTRACT

A tunable colorimetric sensor/optical filter is based on a lithography-free, asymmetric Fabry-Perot cavity. The sensor has a thin-film structure formed by a lossy, porous nanoplasmonic top film deposited on an actively tunable spacer middle layer, and a reflective base layer (either a metal or semiconductor). The structure is fabricated using wafer-scale PVD processes, and the middle layer responds to the presence of a stimulus in the local environment, by expanding in thickness resulting in a shift in resonance wavelength and thus an obvious change in color of the sensor, which color change is detectable by the naked-eye. Such layered geometries exhibit vibrant, macroscopic structural coloration owing to the broadband optical absorption of the top film, enabling the change in spacer thickness to be transduced visually, circumventing the need for sophisticated optical equipment for signal readout to observe the presence of the environmental stimulus.

13 Claims, 12 Drawing Sheets

(56) References Cited

U.S. PATENT DOCUMENTS

2020/0080937 A1* 3/2020 Chanda .................. G01N 21/35
2020/0285043 A1* 9/2020 Nyga .................... G02F 1/0147

* cited by examiner

LARGE-AREA, ACTIVELY TUNABLE, ASYMMETRIC FABRY-PEROT CAVITIES FOR COLORIMETRIC SENSING AND OPTICAL SWITCHING

CROSS REFERENCE TO RELATED APPLICATION

This application claims priority to U.S. Provisional Patent Application Ser. No. 62/802,399 filed Feb. 7, 2019, which is expressly incorporated herein by reference.

ORIGIN OF THE INVENTION

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Nanostructured metal-insulator-metal (MIM) plasmonic metasurfaces and asymmetric Fabry-Perot cavities have attracted considerable attention due to their ability to control light in ways not always possible in natural bulk materials, including near perfect absorption and highly localized electric fields enabling applications in sensing, such as surface enhanced Raman spectroscopy (SERS) and refractometric biosensing, as well as fundamental light-matter investigations (e.g., molecular vibration-cavity coupling and enhanced light emission).

In the context of both sensing and coupled light emission applications, the MIM configuration enables three distinct advantages to plasmonic nanopatterns on a transparent substrate. The first is increased field enhancement and subwavelength light confinement in the interference cavity defined between the top and bottom metal layers. The second advantage is the extra degree of tunability in the spacer layer, which can modulate this interaction both mechanically and chemically. The third advantage is near perfect absorption over wide spectral bandwidths, which contributes to the observed bright/saturated reflected structural colors.

While these metasurface-based absorbers were first demonstrated with engineered plasmonic nanostructures fabricated via top-down techniques (electron beam lithography, focused ion beam milling, etc.), recent efforts have been made to realize the same unique optical properties using more economical and larger-area bottom-up fabrication techniques (colloidal nanoparticles, wet chemical synthesis, and evaporated nanoisland/percolation ultra-thin metal films) that produce random plasmonic nanostructures.

Recent efforts have been made to explore colorimetric sensors, and to explore stimuli-dependent spacers (insulators) in MIM devices. However, while these have produced a measureable resonance shift given the presence of an analyte, the majority of these sensors still require a spectrometer for readout.

SUMMARY

In one aspect, a thin-film sensor includes an optically reflective base layer; a lossy, discontinuous plasmonic metal film top layer arranged over the base layer; and a stimulus-responsive dielectric film middle layer arranged between the base layer and the top layer, and having an optical path length. The middle layer is configured such that when it is exposed to a stimulus, the optical path length reversibly changes to produce a reversible change in a color of light reflected from the sensor that is visible to a naked eye of an observer.

In another aspect, a lithography-free method of making a thin-film sensor for sensing a stimulus includes providing an optically reflective base layer; arranging a stimulus-responsive dielectric film middle layer over the base layer; and arranging a discontinuous plasmonic metal film top layer over the middle layer such that the middle layer is arranged between the base layer and the top layer. Light reflected from the sensor has a color visible to a naked eye of an observer. The middle layer has an optical path length, and is configured such that when the middle layer is exposed to the stimulus, the optical path length reversibly changes to produce a reversible change in the color.

In another aspect, a method of using a sensor to determine the presence of a stimulus in an environment is provided. The sensor includes an optically reflective base layer; a discontinuous plasmonic metal film top layer arranged over the base layer; and a stimulus-responsive dielectric film middle layer arranged between the base layer and the top layer, having an optical path length, and configured such that when exposed to the stimulus, the optical path length reversibly changes to produce a reversible change in a color of light reflected from the sensor and visible to a naked eye of a user. The method includes arranging the sensor in the environment; observing if the color changes; and determining based on the observed color whether or not the stimulus is present in the environment.

DETAILED DESCRIPTION

Figure 1:
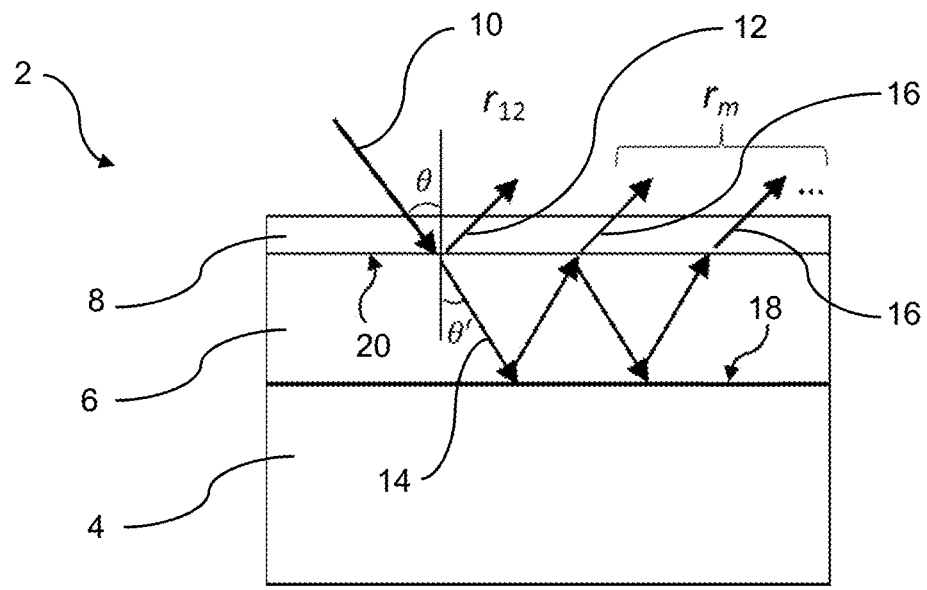
FIG. 1 is a schematic cross-section view of a sensor and incident light interacting with a sensor according to the present subject matter.

The present invention provides a large-area, tunable sensor 2 for detecting the presence of a stimulus (e.g., an analyte) in an environment, and for providing a colorimetric indication of such detection that is visible to the naked eye, via bright, additive (band-pass) reflective structural colors.

The sensor 2 is a thin-film stack of layers including a stimulus-responsive asymmetric Fabry-Perot cavity that acts as a spacer middle layer 6 arranged between an optically thick reflective film base layer 4 and a top layer 8 of a relatively dense and optically lossy plasmonic metal film near the percolation threshold. Depending on the composition of the base layer 4, such configuration provides a metal-insulator-metal (MIM) or metal-insulator-semiconductor (MIS) construction.

The middle layer 6 is active in the presence of the stimulus, such that when exposed to the stimulus, the middle layer has an effective dimension that reversibly changes. In response to the presence/absence of the stimulus, this change in the effective dimension of the middle layer 6 produces a reversible change in a perceived color of the sensor 2. Such color change provides an indication of the presence (or absence) of the stimulus, which may be chemical, biological, thermal or mechanical in nature. The color change is visible to the naked eye, and thus may enable sensitive, naked-eye, on-chip colorimetric sensing. The effective dimension of the middle layer 6 is defined herein as the optical path length (OPL), which is the product of the refractive index (n) and a thickness (d) of the middle layer 6, such that $OPL=nd$.

Conventional colorimetric bio/chemical sensors do not combine the simultaneous mechanical and chemical tunability of the instant sensor, which mechanical and chemical tunability may be coordinated to optimize the sensor response to low concentrations of bio/chemical analytes. While devices may produce a measureable resonance shift in the presence of an analyte, these sensors still require a spectrometer for readout and are therefore not readable by the naked eye, and therefore may not be desirable for on-chip integration/simplicity.

The instant sensor 2 provides a combination of a lossy plasmonic nanoisland film top layer 8 with the tunable spacer middle layer 6, which together enable vibrant color generation and naked-eye, colorimetric sensing.

The sensor 2 provides vibrant structural colors via broadband absorption, owing to the large-area-fabricated plasmonic nanomaterials comprising the top layer 8. The method of making the sensor 2 is lithography-free and may be inexpensively fabricated at full-wafer scale, potentially enabling applications requiring both large-area coverage and tunable plasmonic properties (e.g., perfect absorption), such as solar cells, plasmonic structural colors for display applications, colorimetric sensors, and light emitting devices. Dynamic tuning is enabled by the stimuli-responsive spacer layer.

The thin-film stack in the sensor 2 may be produced by a bottom-up fabrication technique, including a top layer 8 produced using colloidal nanoparticles, wet chemical synthesis, or vapor deposition, to produce lossy metal films composed of random plasmonic nanostructures.

The sensor 2 includes from the bottom up, an optically thick reflective mirror base layer 4, a dielectric spacer middle layer 6, and an ultrathin discontinuous film of metal nanoislands as the top layer 8. Metal may be applied to form the top layer 8 using thermal evaporation at different rates/thickness in order to produce a discontinuous film near the percolation threshold. The top layer 8 may include fractal metal nanoislands 26 with gaps 24 therebetween. Alone, such fractal nanoisland films exhibit many unique properties, including highly confined enhanced electric fields in nanometer-sized gaps, strongly increased local density of states (LDOS), and simultaneous localized and delocalized plasmons. However, in combination with the base layer 4 and middle layer 6, the nanoisland film top layer 8 forms a Fabry-Perot interference cavity, which resonance produces the perceived color of the sensor 2.

As shown in FIG. 1, incident visible light 10 may partially reflect off the middle layer 6 as reflected visible light 12, and also partially transmit through the top layer 8 and middle layer 6 as transmitted light 14. The transmitted light 14 may internally reflect between the base layer 4 and the top layer 8, with some of the transmitted light 14 escaping from the sensor as escaped visible light 16. The reflected light 12 and the escaped light 16 interfere to produce a color that is visible to an observer.

The wavelengths at which the broadband absorption (i.e., suppressed reflection) and strong reflection peaks occur for the sensor 2, determine the color of the entire thin-film stack (i.e., sensor 2) that is perceived by an observer. This perceived color is dependent upon the effective dimension, which is the optical path length (OPL). In response to being exposed to a stimulus, either n or d (or both) may change. Both of these changes to n and/or d, can be transduced with high sensitivity by the absorption resonance of the sensor 2, owing to the subwavelength confinement and highly enhanced electric field inside the middle layer 6, and dependence of the critical coupling condition for perfect light absorption upon the OPL within the middle layer 6. The change in OPL of the middle layer 6 changes the propagation phase accumulated within the spacer cavity, which is given by Equation (1), below, for a single pass:

$$\beta = \left(\frac{2\pi}{\lambda}\right) nd\cos\theta' \quad \text{Equation (1)}$$

where λ is the wavelength, n is the refractive index inside the cavity (middle layer 6), d is the thickness of the cavity, and θ' is the angle of refraction into the cavity. The absorption resonance position, and therefore color of the structure, may be predicted by Equation (2) below, which relates the propagation phase β to the phase acquired at reflections from the top and bottom layers, $\varphi_t$ and $\varphi_b$, respectively:

$$2\beta + \varphi_t + \varphi_b = 2\pi m \quad \text{Equation (2)}$$

where m is an integer defining the order of the cavity mode. Note the propagation phase β is multiplied by 2, to account for the round trip through the cavity. Using Equations (1) and (2), and assuming normal incidence, the absorption resonance wavelength λ can be calculated by Equation (3) below, as follows:

$$\lambda = \frac{4nd}{2m-1} \quad \text{Equation (3)}$$

The net result is that a stimulus-induced change in OPL=nd results in a shift in absorption wavelength λ, and therefore perceived color reflected from the sensor 2.

Because of the strong absorption/critical coupling, modulation of the active dielectric spacer middle layer 6 through adjusting both its thickness and material properties in real-time, post-fabrication, thus enables wide tunability of the sensor 2 to change color in the presence of the stimulus.

Figure 4:
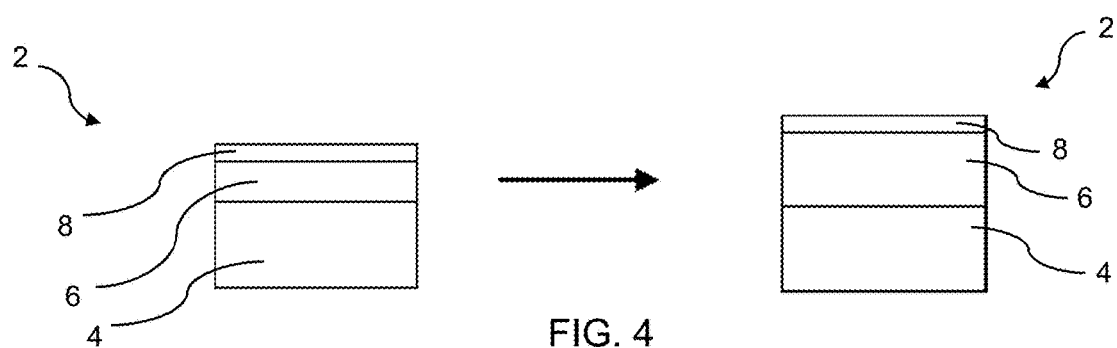
FIG. 4 is a schematic cross-section view of an expanding middle layer of a sensor according to the present subject matter.

The middle layer 6 is "active" or "stimulus-responsive" in that the middle layer 6 has a thickness d and refractive index n that changes (e.g., the thickness d expands, see FIG. 4) upon exposure to a predetermined stimulus, which causes a corresponding change in the color reflected by the thin-film stack comprising the sensor 2. The dimension of the middle layer 6 may be a thickness (d) of the middle layer 6 as measured between the top layer 8 and the base layer 4, but it may also be a width, length, or volume of the middle layer 6.

In a non-limiting example, the middle layer 6 may be chemically-active, which may induce reversible, naked-eye changes in the color reflected from the thin-film stack comprising sensor 2 when the middle layer 6 is exposed to a predetermined chemical. In particular, a thickness of the middle layer 6 may increase or expand in the presence of the chemical, producing a change in optical path length (and therefore accumulated optical phase) between the fractal nanoisland film top layer 8 and the base layer 4. Because the top layer 8 and base layer 4 are comprise an optical interference cavity, this change in optical path length between them produces a change in optical interaction between them, which may result in a change in the color of the visible light reflected by sensor 2. This construction and design may be used for on-chip bio/chemical sensing.

The combination of a reversibly tunable middle layer 6 with the highly sensitive additive (band-pass) structural color generation of the entire thin-film stack, provides an on-chip colorimetric biosensor 2. The sensor 2 may be used as a rapid, sensitive, low-cost, easy-to-use bio/chemical detection device, which may be useful for medical diagnostics and environmental monitoring in resources-limited locations. The sensor 2 may also be applied to other settings (e.g., astronaut health monitoring) with similar requirements in terms of size, mass, sensitivity and simple/effective readout.

Figure 8:
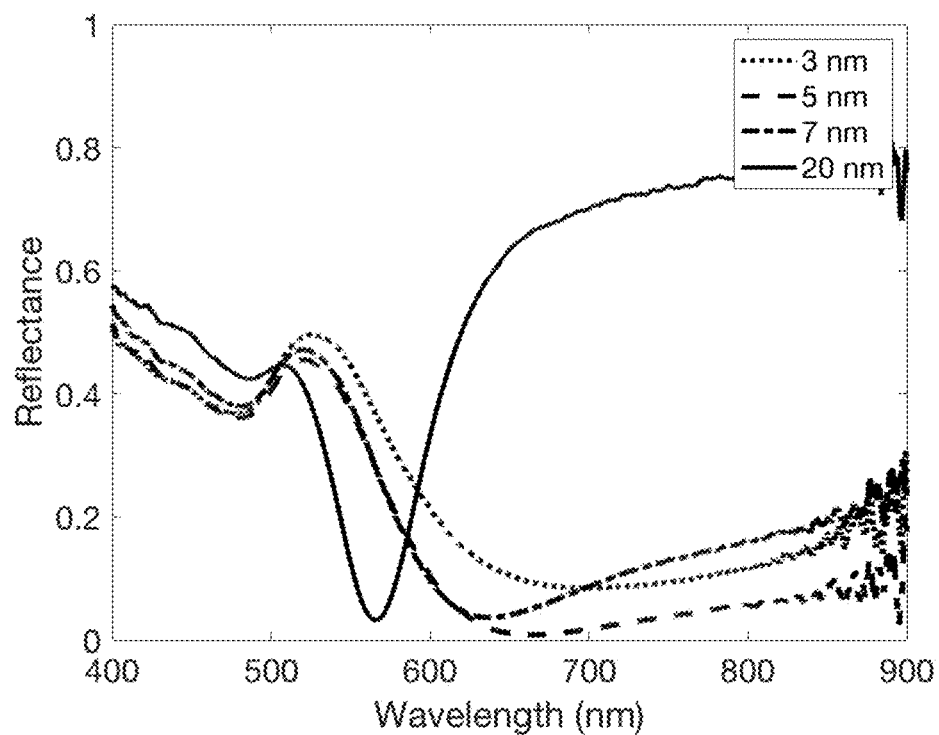
FIG. 8 is reflection spectra of four example sensors with various top layer thicknesses according to the present subject matter.

Such layered geometries of the sensor 2 exhibit vibrant, macroscopic structural coloration and broadband optical absorption, which may obviate the need for sophisticated optical equipment for signal readout of the sensor 2. The reflective structural colors of this device are additive (e.g., band-pass) colors, as opposed to subtractive (i.e. band-stop) colors seen in typically MIM devices. The band-pass colors visible from the sensors 2 offer higher color-purity/saturation compared to band-stop colors, and may offer greater perceived color shifts for a given stimulus. The bright additive colors here are controlled by the absorption profile, which is strongly dependent on film properties of the top layer 8, wherein broadband absorption produces a highly saturated band-pass color (in contrast to narrow-band absorption with comparatively low-saturation, band-stop colors). The differences in absorption profile are shown in FIG. 8, where the continuous (20 nm) top film makes up a narrow-band absorber, while the discontinuous nanoisland films make up broadband absorbers (3-7 nm).

The unique combination of strong, wafer-scale broadband absorption and a dynamically tunable spacer middle layer 6 provides vibrantly-colored, active thin-film structures, ideal for colorimetric far-field signal readout. The sensor 2 may provide fast and fully reversible color-tuning that is observable to the naked-eye.

Base Layer

The base layer 4 is not particularly limited, and includes an optically thick (i.e., opaque) material that is reflective to the transmitted light 14 on its top surface 18. In conjunction with the top layer 8, which is partially reflective on its bottom surface 20, the sensor 2 forms a Fabry-Perot cavity as the middle layer 6, which has an absorption position defined by the optical path length dependent on the thickness d and refractive index n of the cavity given by Equation (1). The absorption bandwidth is determined by the material losses of both the top layer 8 and base layer 4.

The amount of reflectivity of the mirror base layer 4, which may be based on the material used to form the base layer 4, can be used as another means to control the cavity resonance of the middle layer 6, and therefore the overall reflection profile of the sensor 2. The base layer 4 may include various reflective materials, including metals, such as gold, silver and aluminum; or semiconductors, such as silicon.

At optical frequencies, metals, such as gold, have finite conductivity, allowing some visible light to propagate into the mass of the metal, as well as nonzero optical loss (imaginary component of refractive index n), causing a phase shift and exponential damping of the wave. Semiconductors, such as silicon are also assumed to have nontrivial losses in this frequency range and corresponding damping and phase shifts. Therefore, the phase shift of the reflected wave at the interface between the base layer 4 and the middle layer 6 will be a function of each particular material dispersion for the reflector. As shown in FIG. 8, the interference cavity formed in part by the reflective silicon base layer 4 provides a much different response compared to a reflective gold base layer 4, owing to the different material dispersions and therefore different phase shifts imparted by each material. Determining the reflector material used in the base layer 4 can therefore be used to engineer the overall response of the sensor 2 to incident light 10, thus providing another parameter to tune in the optimization of these structures.

The base layer 4 may be a stand-alone layer (FIG. 1) including a semiconductor (e.g., silicon wafer), a gold layer, or other material reflective to the transmitted light 14. The base layer 4 may optionally be arranged on a substrate (not shown). Where the base layer 4 includes gold, the gold base layer 4 may be arranged (e.g., by sputtering) on a silicon wafer substrate. In this example, an intervening titanium adhesion layer (not shown) may be arranged (e.g., by sputtering on the wafer at a thickness of 3-20 nm, preferably about 5 nm) between the silicon wafer substrate and the gold base layer 4 to increase the adhesion between the two materials.

The base layer 4 may include other materials that are reflective of the transmitted light 14, such as various metals or alloys including aluminum, silver, stainless steel, copper, or platinum, for example. The base layer 4 may be formed by various methods including casting, sputtering, or other formations techniques.

For perfectly absorbing structures, the thickness of the base layer 4 should be greater than the skin depth of the material in the frequency range of interest (e.g., for gold at optical frequencies, it should be >ca. 60 nm). In one non-limiting embodiment, the base layer 4 includes gold, and has a thickness of 150-200 nm. The base layer 4 may have a reflectance (R) of visible light of greater than 90%.

Middle Layer

The middle layer 6 occupies a distance between the base layer 4 and the top layer 8, and allows the transmitted light 14 to propagate therethrough (i.e., is transparent or translucent) and may also act as a waveguide.

The middle layer 6 may have an initial effective dimension (i.e. OPL) of a certain value when not exposed to the stimulus, which causes the entire thin-film stack (i.e., sensor 2) to reflect a corresponding initial color. When exposed to the stimulus, the middle layer 6 may change in thickness d and/or refractive index n to have a different second thickness d' that is smaller or larger that the initial thickness d, and a second refractive index n' which is smaller or larger than the initial refractive index n. The change in the thickness and/or refractive index of the middle layer 6 from the initial thickness and refractive index to the new thickness and refractive index, will alter the optical path length in the cavity according to Equation (1), and cause the thin-film stack (i.e., sensor 2) to have a corresponding change in color from the initial color to a different second color based on the change in the absorption resonance position.

This change in the dimension d (and/or refractive index n) of the middle layer 6 may result in a change in the optical path length between the base layer 4 and the top layer 8, a change in the lateral distance between the fractal nanoislands of the top layer 8, or combinations thereof, any of which may result in a change of color reflected from sensor 2 from the initial color to the second color. The effect of the former (i.e., changing the optical path length vertically between the two reflective layers) is expected to be much larger than the former (i.e., changing the lateral spacing between nanoislands).

This change in dimension d (and/or refractive index n) of the middle layer 6 and the corresponding change in color may be reversible based on the presence/absence of the stimulus, or may be permanent. When the change is reversible, the middle layer 6 may return from the second configuration (thickness and refractive index) to the initial configuration upon removal of the predetermined stimulus from the middle layer 6, thus causing the color of the sensor 2 to return from the second color to the initial color. When the change is permanent, the middle layer 6 may not return from the second configuration to the initial configuration upon removal of the predetermined stimulus from the middle layer 6.

The initial configuration of the middle layer 6 may be tuned at the time of manufacturing the middle layer 6. The amount of change in the dimension and/or refractive index of the middle layer 6 may be determined by the type or composition of the material used in the middle layer 6, the amount of stimulus to which the middle layer 6 is exposed, or surrounding environmental factors such as temperature or pressure.

The middle layer 6 is active based on the exposure to the predetermined stimulus, which may include a chemical, temperature, humidity, pressure, etc. In a non-limiting example, the middle layer 6 is chemically-active, and thus experiences a change in the dimension when exposed to a predetermined chemical. In this situation, the middle layer 6 may be soluble in the predetermined chemical, and thus absorb the chemical upon exposure thereto, and thus the middle layer 6 may increase in thickness. The material of the middle layer 6 may be a polymer, a composite material, a ceramic or glass material, or other transparent or translucent material. For typical chemical vapor sensing examples using polymer spacers, the change in a dimension (e.g., thickness) is the primary driver of the color change (while, change in refractive index may only have a small/negligible effect).

The composition of the middle layer 6 may be chosen based upon the stimulus that is desired to be detected. That is, the middle layer 6 may include one of a number of different compositions that are each reactive to a different stimulus. The middle layer 6 may include a plurality of different compositions, each reactive to a different stimulus. The middle layer 6 may be able to detect one or more stimuli, either through the composition of the middle layer 6 being reactive to more than one stimulus, or by the middle layer 6 including a plurality of compositions that are each reactive to a different stimulus. In a non-limiting embodiment, the middle layer 6 includes or consists of poly(methyl methacrylate) (PMMA), which is an optically transparent polymer that responds to exposure to certain organic solvents (e.g., ethanol, isopropanol, and acetone), including in the form of vapors, present in the local surrounding environment. Increased bio/chemical molecular specificity may be achieved by incorporating a selective recognition element into the spacer material such as a molecularly imprinted polymer (MIP) or other detection schemes, including functionalized carbon nanotubes, and metal oxide nanoparticles.

The thickness of the middle layer 6 should be less than ca. 500 nm. If the middle layer 6 had a thickness at or above 500 nm, this could produce potentially undesirable iridescence/angular sensitivity to incident light 10 in practical lab-on-chip applications. The middle layer 6 may have an initial thickness of ca. 80 nm to 250 nm.

The thin-film structure comprising sensor 2 may respond passively to the environment, or it may be driven by a controlled stimulus producing a repeatable response as an actuator. When operating as an actuator, the structure comprising the sensor 2 may be used in applications such as active optical switching (with switching contrasts >90% demonstrated for the instant thin-film structure), color filtering, and as a tunable resonance cavity for enhanced light emission.

Top Layer

The sensor 2 includes a relatively dense plasmonic film top layer 8 that has a coverage rate over the middle layer 6 that is near (i.e., at or below) the percolation threshold. The coverage rate of the top layer 8 may depend on the amount of material deposited to form the top layer 8. Thus, the amount of material applied may be limited in order not to exceed the percolation threshold. The top layer 8 may be arranged over, e.g. directly in contact with, the middle layer 6.

Figure 3:
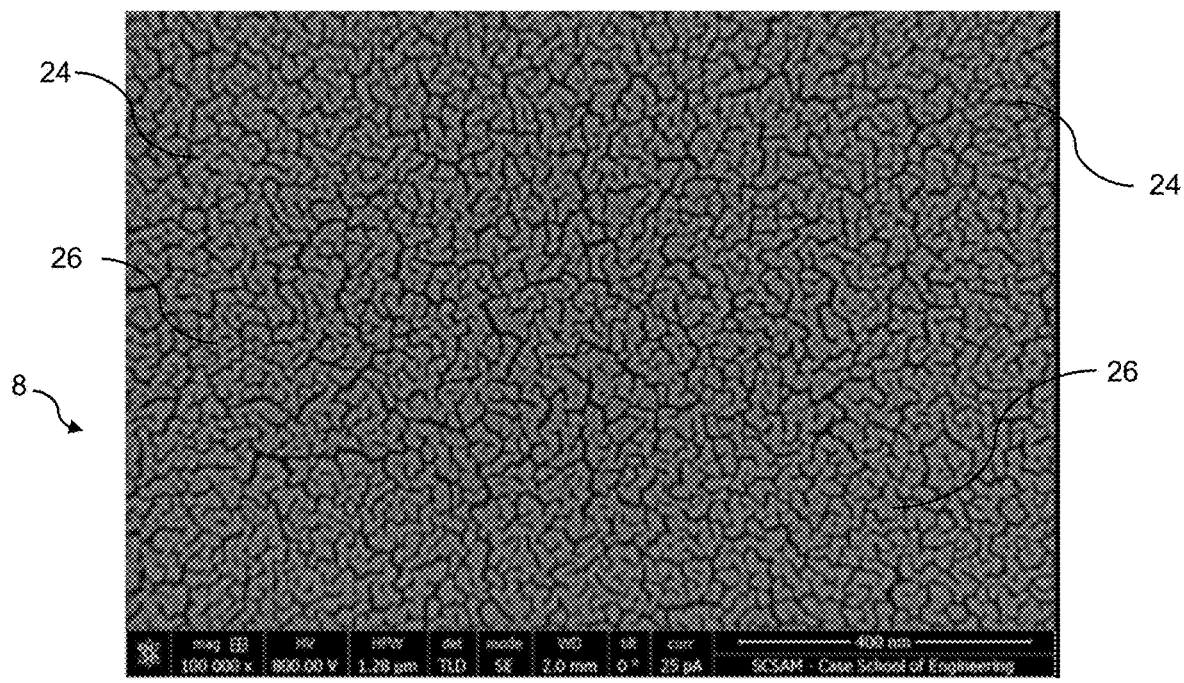
FIG. 3 is an SEM photograph of an example top layer of a sensor according to the present subject matter.

The plasmonic film of the top layer 8 may include a metal fractal nanoisland structure, for example as shown in FIG. 3. Because the top layer 8 is near the percolation threshold, the top layer 8 is discontinuous, i.e. semi-continuous or non-continuous, and may include a disordered array of irregularly shaped nanoislands 26 of metal with nanometer-sized gaps 24 (e.g. air gaps) between them. The nanoislands 26 may interconnect to form semi-continuous paths across the face of the sensor 2.

The top layer 8 may be formed from a material that is partially reflective to incident light 10. The top layer 8 may include various metals or alloys including gold, aluminum, silver, stainless steel, copper, or platinum, for example. In a non-limiting example, the top layer 8 is gold.

The gaps 24 may extend through the entire thickness of the top layer 8 such that a portion of the incident light 10 may be transmitted through the top layer 6, e.g. through the air gaps 24, as transmitted light 14, while another portion of the incident light 10 may be reflected by the top layer 8 or at the interface between the top layer 8 and the middle layer 6 as the reflected light 12. Taken together, the air gaps 24 and gold nanoislands 26 constitute an effective medium in top layer 8, with optical properties significantly different than the constituent air and gold components. To obtain the broadband absorption which is desirable for creating the vibrant, additive reflective colors, the optical loss of the effective medium in the top layer 8 should be high. The high loss may be obtained via fractal nanoisland films as demonstrated herein, or by colloidal nanoparticle films, nanoporous metal films, or by other methods which mix different regions of air gaps and metal nanoparticles to form a lossy effective medium.

The fractal nanoisland 26 metallic film top layer 8 may offer unique absorption profiles, enabling vibrant structural color generation in a metal-insulator-metal (MIM) configuration. When combined with a stimulus-responsive insulator material in the middle layer 6, the changes in the environment (i.e., presence of a stimulus) may be transduced as a noticeable shift in reflected color. In the bio/chemical sensing example, upon binding of the target analytes to the middle layer 6, the middle layer 6 may expand, thereby changing the optical interference cavity formed between the nanoisland film top layer 8 and the mirror base layer 4; the net effect being a change in the color of the light reflected from the sensor 2. These geometry of sensor 2 provides near-perfect absorption via destructive interference between i) the incident light 10 and ii) the reflected light 12 and the escaped light 16, thereby producing a minimum in reflection. Assuming there is no transmission through the sensor 2, all of the energy is assumed to be absorbed. The absorption peak of the sensor 2 is associated with a resonance, based on which fields in the Fabry-Perot cavity are highly enhanced and localized in the middle layer 6. As such, a change in the thickness of the middle layer 6 changes the resonance frequency, and thus changes the perceived color of the sensor 2.

The lossy plasmonic nanoisland film top layer 8 may be formed by wet chemical synthesis, vapor deposition (physical vapor deposition or chemical vapor deposition), dealloying, or other techniques. If produced by wet chemical synthesis, on-chip microfluidic synthesis of the top layer 8 may be realized, and fabrication costs may be reduced even further compared to physical vapor deposition of the top layer 8.

The top layer 8 may define an exposed surface of the sensor 2, but this is not required, and one or more additional layers may be arranged over the top layer 8. The change in color of the sensor 2 may depend on the change in thickness of the middle layer 6, but also/alternatively may depend on a reversible change in the size of the gaps 24 between the nanoislands 26. This change in the size of the gaps 24 may correspond to a change in the dimension of the middle layer 6, wherein an increase in a dimension of the middle layer 6 (e.g. lateral or width direction of the middle layer 6) increases the size of the gaps 24 between the nanoislands 26. The change in the size of the gaps 24 may produce a change in the perceived color of the sensor 2. Since the plasmonic film of the top layer 8 is at a critical transition point (i.e. near the percolation threshold), this tuning may be possible. The effect of changing the size of the gaps 24 may also be leveraged to produce a type of binary sensor that responds to the state of the middle layer 6, e.g. ON for contracted, OFF for expanded.

Differences in the film topology of the top layer 8 (coverage rate of the nanoislands 26, size of the gaps 24, etc.) may also be tailored, where the film topology may be determined based upon the effective mass of metal deposited to form the plasmonic film top layer 8. The effective mass may be measured using a crystal quartz balance and the output assumes a continuous film at the measured mass thickness. At or below the percolation threshold, metal films are known to be discontinuous. Differences in the film topology may result with just 1 nm difference in effective mass, which may produce a significant change in the filling factor of the top layer 8.

The lossy nanoisland film top layer 8 contributes to producing the absorption responsible for the bright, macroscopic coloration of the sensor 2. Localized surface plasmon resonances from the sub-wavelength nanoislands 26 can achieve broadband absorption, owing to the large size distribution of the nanoislands 26.

For bio/chemical sensing applications, the top layer may be porous to promote diffusion of the bio/chemical analytes into the spacer layer where they may absorbed.

Other Layers

The sensor 2 may include other layers or coatings not depicted in the figures. The other layers or coating may be included above, below, or in between the described layers, and included to enhance a desired attribute of the sensor 2, including modulating the optical path length through each layer, the various described layers 4, 6, 8 of the sensors 2, or interaction between the layers. In a non-limiting example, the sensor 2 includes a titanium adhesion layer arranged between a gold base layer 4 and a silicon wafer substrate.

Methods

The sensor 2 may be fabricated via a bottom-up method, where the middle layer 6 and top layer 8 are formed on top of the preceding layer(s). The method may be lithography-free. That is, the layers may be formed by methods other than by using lithography.

The sensor 2 may be formed by providing an optically reflective base layer 4. The base layer 4 may be provided using various methods including casting, sputtering, or other formations techniques. The base layer 4 may include a gold layer, which may be provided by sputtering gold on a silicon wafer or other substrate, optionally with an intervening adhesion (e.g., titanium or chromium) layer. Alternatively, the base layer 4 may be a semiconductor (e.g., a silicon wafer) without a gold layer, or other reflective material such as aluminum, silver, stainless steel, copper, or platinum, for example.

The method may include arranging a stimulus-responsive middle layer 6 over the base layer 4. The middle layer 6 may be provided by being formed over, and optionally directly in contact with, the base layer 4. The middle layer 6 is arranged between the base layer 4 and the top layer 8. The middle layer 6 may be formed from a polymer, optionally PMMA, by spin coating the polymer directly on the base layer 4. Other coating techniques can be used to form the middle layer 6, including spraying, brushing, casting, extrusion, roll coating, printing, etc.

The method may include arranging a plasmonic film top layer 8 over, optionally directly in contact with, the middle layer 6. The top layer 8 may include a discontinuous film of irregularly shaped metal nanoislands 26. The entire thin-film structure (layers 8, 6, and 4) together produce a perceived color visible to a naked eye of an observer. The middle layer 6 may have an effective dimension (i.e., optical path length, OPL) that when exposed to the predetermined stimulus reversibly changes to produce a reversible change in the color of the thin-film structure.

The top layer 8 may be formed using colloidal nanoparticles, wet chemical synthesis, or vapor deposition, which may produce percolation films with random plasmonic nanostructures (e.g., irregularly shaped metal nanoislands 26), or other randomly positioned metal nanoparticles separated by small air gaps, in each case composing a lossy effective medium. In a non-limiting embodiment, the top layer 8 is formed by physical vapor deposition (e.g., thermal evaporation) of gold metal.

If a wet-chemical synthesis route is used, this may include chemical reactions in the solution phase using precursors at proper experimental conditions to form the top layer 8. These routes may include solvothermal synthesis, hydrothermal synthesis, template synthesis, self-assembly, oriented attachment, hot-injection, or interface-mediated synthesis.

The top layer 8 of sensor 2 is applied at or below a percolation threshold, which produces a random network of irregularly shaped, interconnected, gold metal nanoislands 26 having nanometer-sized gaps 24 between them.

The sensor 2 may be used to determine the presence of an unknown stimulus in an environment (e.g., acting as a sensor, which may be both qualitative and quantitative). Alternatively, the structure may respond to a predetermined stimulus and change color accordingly (e.g., being driven as an actuator, with possible applications including optical switching and color displays). The method may include arranging the sensor 2 in the environment, and observing if the color reflected from the thin-film stack comprising sensor 2 changes from an initial color before the sensor 2 was in the environment, to a different subsequent color after the sensor 2 is arranged in the environment. The method includes determining based on the observed color change of the structure whether or not the stimulus is present in the environment. If the color of the structure changes from the initial color to a different subsequent color, then it can be determined that the stimulus is present in the environment. If the color of the structure does not change from the initial color to a different subsequent color, then it can be determined that the stimulus is not present in the environment. Likewise, the color of the structure may be controlled actively, by introducing a known stimulus.

Non-limiting example sensing applications for the senor 2 include those for breath analysis, bacterial species identification, environmental monitoring, and detection of explosives.

Non-limiting example actuation applications include those for active optical switching, tunable color filtering, and a tunable resonance cavity for molecular vibrational experiments, and lasing/spontaneous emission applications.

Examples

Figure 2:
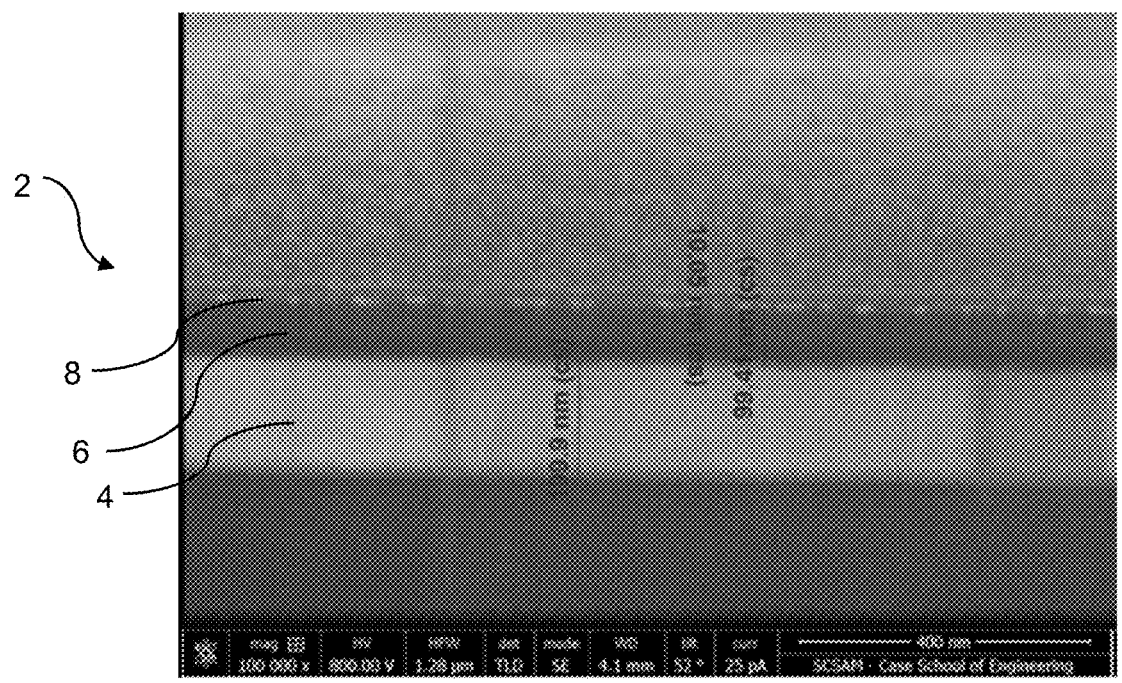
FIG. 2 is a SEM photograph of an example sensor in cross section according to the present subject matter.

In order to characterize the performance of the asymmetric Fabry-Perot cavity structures of the sensor 2 for colorimetric sensing, example metal-insulator-metal (MIM) and metal-insulator-semiconductor MIS sensors were fabricated and tested as follows. As seen in FIG. 2, an example MIM sensor was fabricated and had a top layer 8 thickness of 10.05 nm, a middle layer 6 thickness of 99.41 nm, and a base layer 4 thickness of 199.9 nm. As seen in FIG. 3, an example top layer 8 includes a film of nanoislands 26 separated by gaps 24.

All of the sensors were fabricated exclusively by lithography-free deposition processes. Silicon wafers (available from QSS, Inc.) were utilized as the substrate layer, and were processed in the Microelectronics Cleanroom at NASA Glenn Research Center, which is a Class 1000 cleanroom. For the MIM structures, a titanium (Ti) adhesion layer was sputtered at 5 nm thick onto the silicon wafer, followed by sputtering of gold to form an optically thick (200 nm) gold mirror base layer 4 on the substrate. Sputtering was performed at a pressure of $10^{-3}$ Torr, in an argon atmosphere, at 100 W RF power. However, some example sensors use the silicon wafer as the base layer 4, and therefore no titanium or gold layers were sputtered thereon.

Depending on the sensor, either $SiO_2$ was sputtered ($10^{-3}$ Torr, argon, 200 W RF power) as the middle layer 6 over the base layer 4, or a polymer film was spin coated as the middle layer 6 over the base layer 4. For those coated with a polymer, the base layers were rinsed with acetone and then with isopropanol prior to spin coating. Poly(methyl methacrylate) (PMMA), grade 950-PMMA-C2 supplied by MicroChem Corp., was used as the polymer to form the middle layer 6. The PMMA was used as received and spin coated for 60 seconds from 1000 rpm-6000 rpm at a 1000 rpm/s ramp rate. Finally, the sensors were baked on a hot plate at 180° C. for 8 minutes. $SiO_2$ is reactive to temperature, while PMMA is reactive to certain chemicals.

The middle layer 6 thicknesses were measured using spectroscopic ellipsometry on a V-VASE® ellipsometer provided by J.A. Woollam Co., Inc. The as-fabricated PMMA film middle layers 6 were found to be between ca. 80 nm and 210 nm thick, depending on the spin speed, and were in good agreement with the spin curves from MicroChem.

The gold films top layers 8 were then deposited using electron beam evaporation using a machine provided by MDC Vacuum Products, LLC. The top layers 8 were deposited at a rate of 0.5 nm/s, a power of 6.8 kV, and pressure of $10^{-6}$ Torr, until an effective mass thickness of 5 nm was obtained, which mass thickness was measured by a crystal quartz mass balance. The resulting top layers 8 were near the percolation threshold and were therefore composed of an interconnected network of nanoislands similar to that as shown in FIG. 3.

Figure 5:
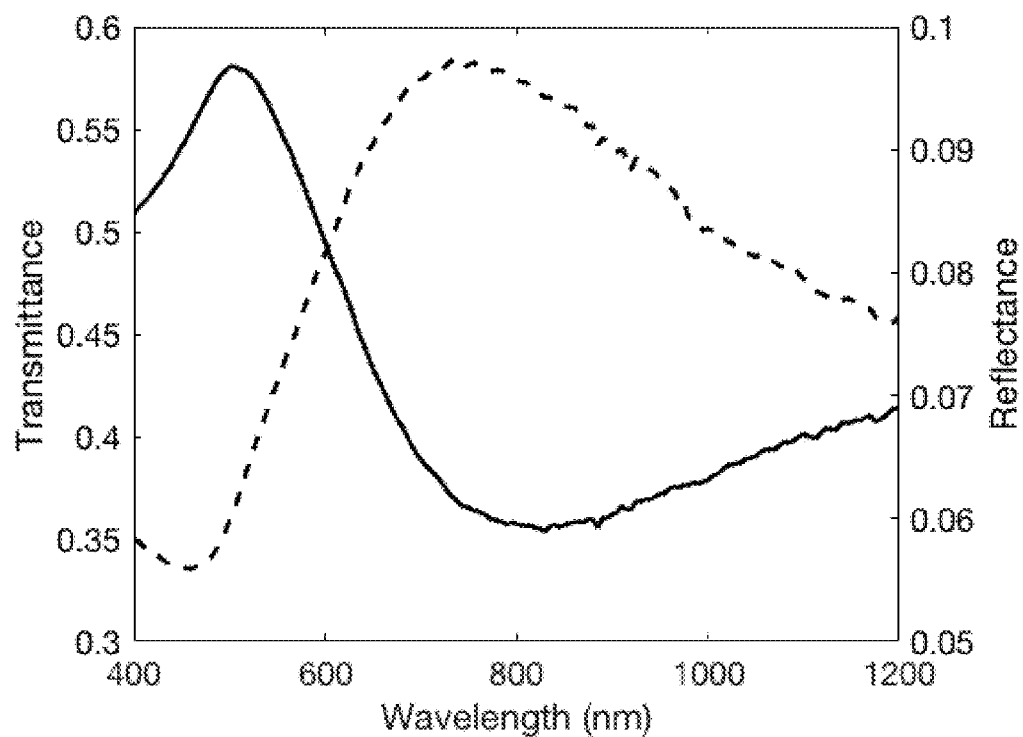
FIG. 5 is a transmission and reflection spectra of an example lossy, nanoisland film alone, deposited on a glass slide according to the present subject matter.
Figure 6:
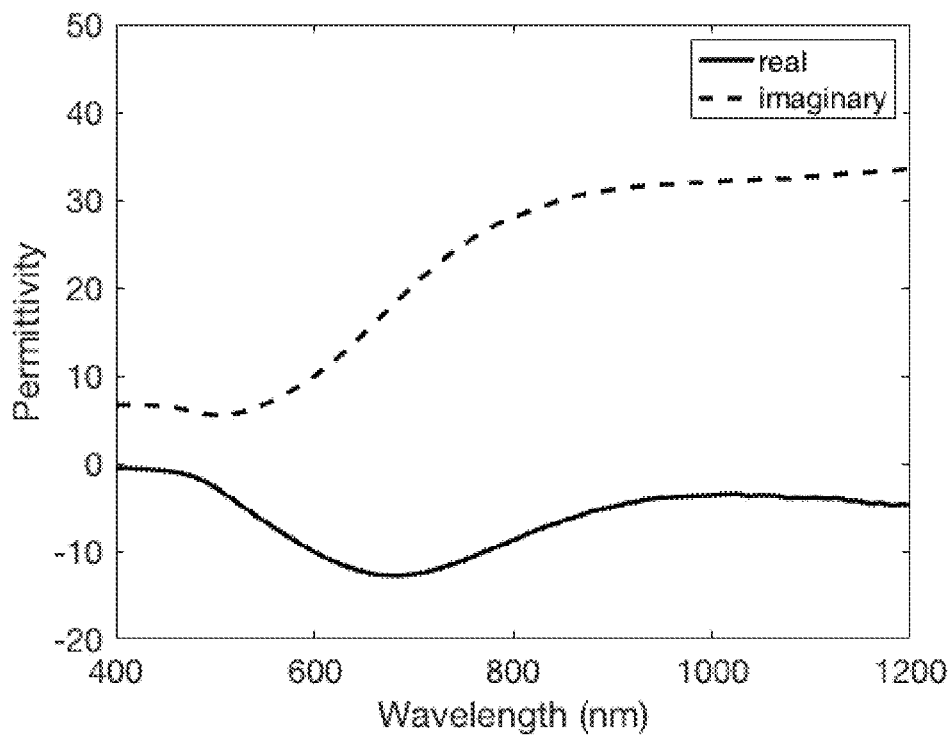
FIG. 6 is permittivity spectra of an example sensor according to the present subject matter.

Spectroscopic ellipsometry measurements were made on the example sensors. Variable-angle spectroscopic ellipsometry was employed using the V-VASE® ellipsometer provided by J.A. Woollam Co., Inc., in order to extract the permittivity of the nanoisland film top layer 8. A gold film having an effective mass thickness of 5 nm and deposited on a glass slide was used for this measurement. The permittivity of just this gold film was extracted by assuming an actual thickness of 10 nm (based on SEM cross sections, see FIG. 2) and fitting the measurement to a multi-layer Fresnel model. The measured reflection and transmission spectra of the nanoisland film on the glass slide are shown in FIG. 5. The fidelity of the model was confirmed by using the extracted permittivity for the top layer 8 in different MIM and MIS sensors 2, with excellent agreement to experimental measurements (simulations not shown here). The PMMA film thicknesses were also estimated using ellipsometry, and found to be in excellent agreement with experiment.

Figure 7:
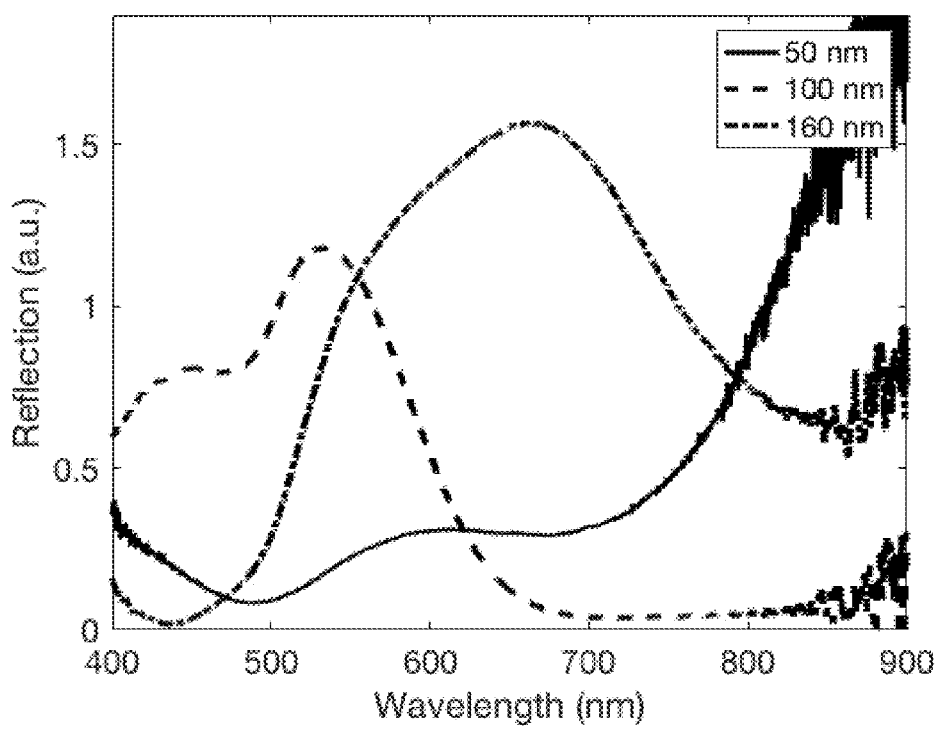
FIG. 7 is reflection spectra of three examples sensors with various middle layer thicknesses according to the present subject matter.

Optical measurements were made on the example sensors. Normally-incident white light was focused onto the sensors with a Mitutoyo 20× objective (NA=0.28). A polarizer was in place for these measurements. However, the polarizer may be omitted because the isotropic MIM and MIS sensors are not sensitive to polarization for normally-incident light. The reflected light was collected through the same objective and directed towards a beam splitter, where half of the light was focused onto a CCD camera provided by Thorlabs, Inc. (Thorcam USB 3.0) and the other half was focused onto a fiber and directed towards a spectrometer provided by Ocean Insight (model Flame-T UV/VIS/NIR). All measurements (with the exception of FIG. 7, which used an Si wafer for reference) were referenced to a >97.5% reflective silver mirror (Thorlabs ME2-P01), and normalized according to the following equation:

$$S(\lambda) = \frac{R_M(\lambda) - N(\lambda)}{R_{ref}(\lambda) - N(\lambda)} \quad (4)$$

where $R_M$ is the raw spectrum reflected from the sensor 2, $R_{ref}$ is the reflected spectrum from the silver mirror, and N is the noise spectrum (dark signal) obtained by blocking all light incident on the spectrometer entrance slit. Silver was chosen because of its high reflectivity (>97.5%) and flat reflection profile in the frequency range of interest (400 nm to 900 nm). Using an independent reference in this way makes it possible to obtain information from the full MIM or MIS sensor, as well as the films without the top layer 8 (i.e., an IM or IS stack). Other common normalization schemes 'divide out' information about the background, since that information may not be relevant for the analysis. However, preserving this information is important during analysis of the example sensors, because it enables direct comparison between the MIM (MIS) and IM (IS) responses.

Electromagnetic simulation measurements were made on the example sensors using CST Microwave Studio available from Dassault Systémes, Inc. Floquet unit cell boundary conditions were applied in the x- and y-directions (defining a plane parallel to the surfaces of the thin-film layers). The optical properties of Johnson and Christy were used for the gold mirror base layer 4, the middle dielectric layer had a constant refractive index of 1.5, and the top layer 8 was modeled using the optical constants extracted from the spectroscopic ellipsometry. A plane wave at normal incidence to the thin-film stack was used to illuminate the sensor through an open boundary from the −z direction (top). In the MIM case, an optically thick (200 nm) Au mirror was terminated with an electric boundary at the +z direction end (bottom); therefore, the MIM geometry/setup does not support any transmission through the structure and all of the incident light is either reflected or absorbed. In the MIS case, an open boundary in the +z direction was used, allowing some transmission through the structure.

Figure 10:
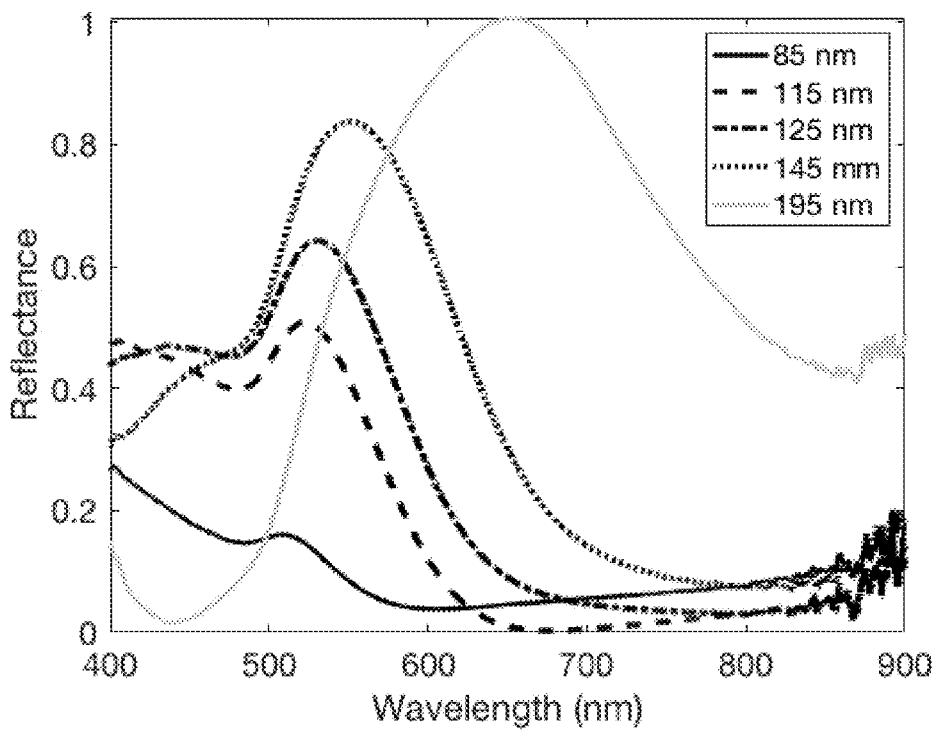
FIG. 10 is reflection spectra of five example sensors with different middle layer thicknesses and a gold base layer according to the present subject matter.

Example sensors with 5 nm thick gold top layers, and 85 nm to 195 nm thick PMMA middle layers 6 were measured in reflection spectra (FIG. 10). The broad resonance of nanoisland film top layers 8 contributed to broadband absorption seen in FIG. 10. This can be seen especially in the example sensor with the 115 nm thick PMMA middle layer 6, which exhibited nearly perfect (>95%) absorption over a bandwidth from ca. 650 nm to 900 nm.

In order to investigate the role of absorption in the top layer 8 in more detail, example sensors with a fixed middle layer 6 thickness of 115 nm PMMA (with refractive index of n=1.5) were prepared on a 200 nm thick Au mirror base layers 4. These examples sensors had a gold film top layer 8 with a thicknesses of 3 nm, 5 nm, 7 nm, or 20 nm. Those sensors with a top layer 8 thickness from 3 nm, 5 nm, and 7 nm represent lossy, porous/nanoisland effective medium films. The top layer that is 20 nm thick is continuous, yet thinner than the skin depth of gold (which is approximately 30 nm at λ=600 nm), so some of the incident light is able to enter the middle layer 6. From the reflection spectra for these sensors (FIG. 8), there appears to be an optimal thickness for the nanoisland film of 5 nm for perfect absorption, for which the effective input impedance of the thin-film stack comprising sensor 2 is matched to the free-space wave impedance. For the continuous 20 nm thick top layer 8, the resonance dip is much narrower, and the perceived color (magenta) is also dramatically different in comparison to the color (greenish-blue) of the 3 nm, 5 nm, and 7 nm thick nanoisland films. The narrower resonance feature of the 20 nm film may be attributed to lower absorption losses. These results show that the absorption bandwidth and strength may both be tuned significantly by varying the top layer 8 film thickness.

Figure 9:
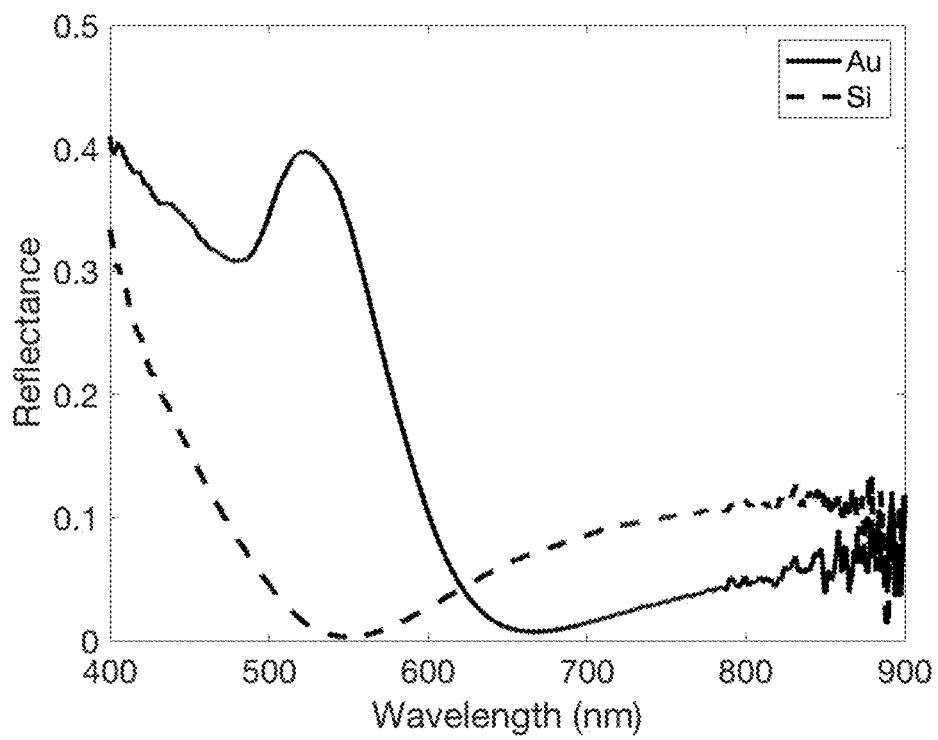
FIG. 9 is reflection spectra of two example sensors with different bottom layer materials according to the present subject matter.

The base layer 4 can also be considered as another means to control the absorption resonance, and thus control the overall reflection profile of the sensor 2. In order to explore the impact on the reflected light, two different reflector materials for the base layer 4 were compared: gold vs. silicon. Examples with the different reflector materials were prepared with identical middle layers 6 (i.e., 115 nm thick PMMA) and top layers 8 (i.e., 5 nm thick Au). The interference cavity formed by the silicon reflector provides a much different response compared to gold (see FIG. 9), owing to the different material dispersion and therefore different phase shifts. The reflector material of the base layer 4 can therefore be used to engineer the overall response of the sensor 2, providing another parameter to tune in the optimization of these sensors 2.

Figure 22:
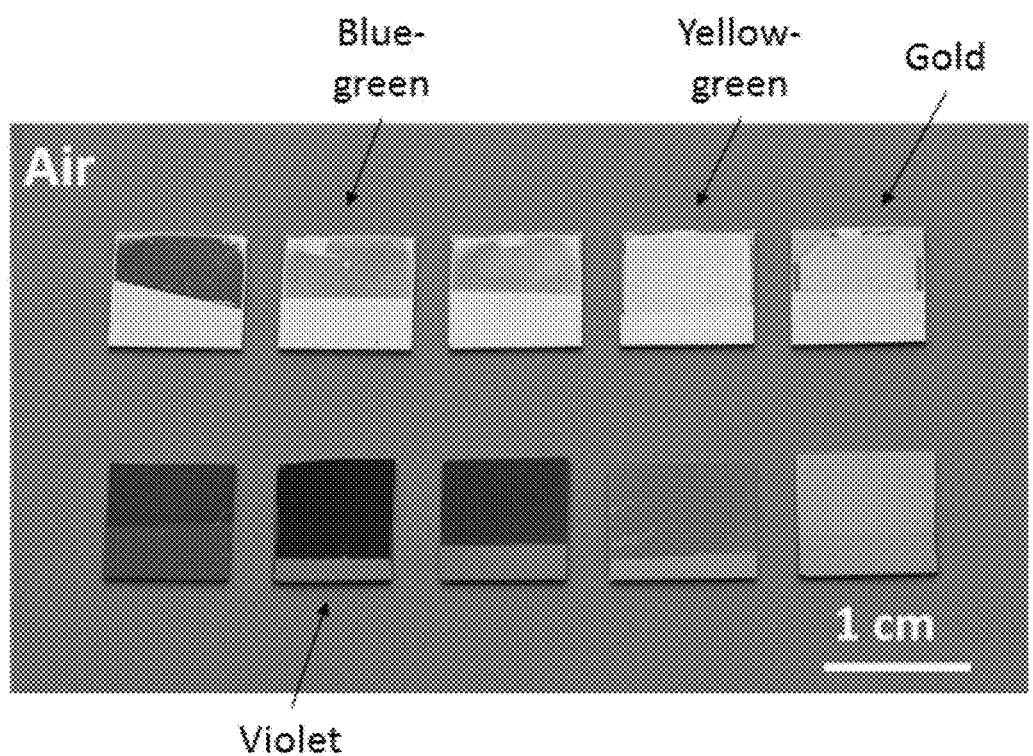
FIG. 22 is a photograph of ten example sensors with different middle layer thicknesses, with either a gold base layer, or silicon base layer in air according to the present subject matter.
Figure 23:
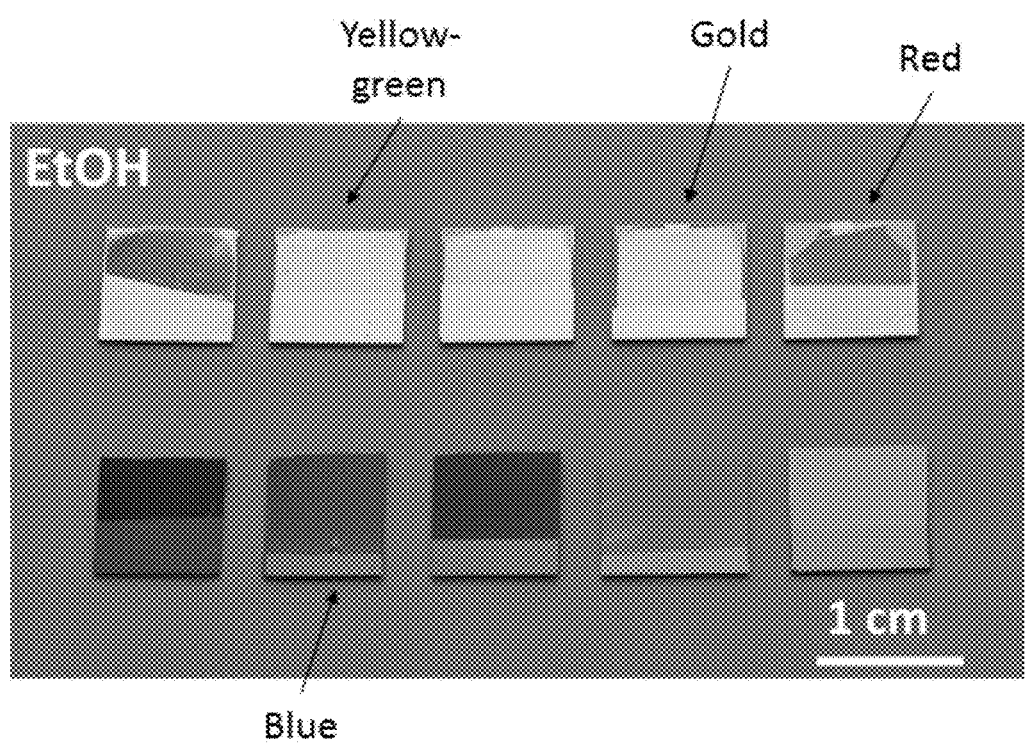
FIG. 23 is a photograph of ten example sensors with different middle layer thicknesses, with either a gold base layer, or silicon base layer in ethanol according to the present subject matter.

The color reflected from the MIM and MIS example sensors based upon the thickness of the middle layer 6 was explored. Example sensors with PMMA middle layers 6 ranging from 85 nm to 195 nm were prepared on 200 nm Au mirror base layers 4. All examples sensors had a 5 nm Au top layer 8. The full MIM sensor stack produced brightly colored surfaces. FIG. 10 shows the measured reflection spectra for each example MIM sensor. FIG. 22 shows pictures of actual MIM sensors in order of middle layer thickness in the top row, from left to right, of 85 nm, 115 nm, 125 nm, 145 nm, and 195 nm in air, and FIG. 23 shows the same MIM sensors in the same order, but in ethanol. As can be seen between FIGS. 22 and 23, and as indicated therein, the appearance to the naked eye changes based on the environment in which the MIM sensor is placed.

Figure 11:
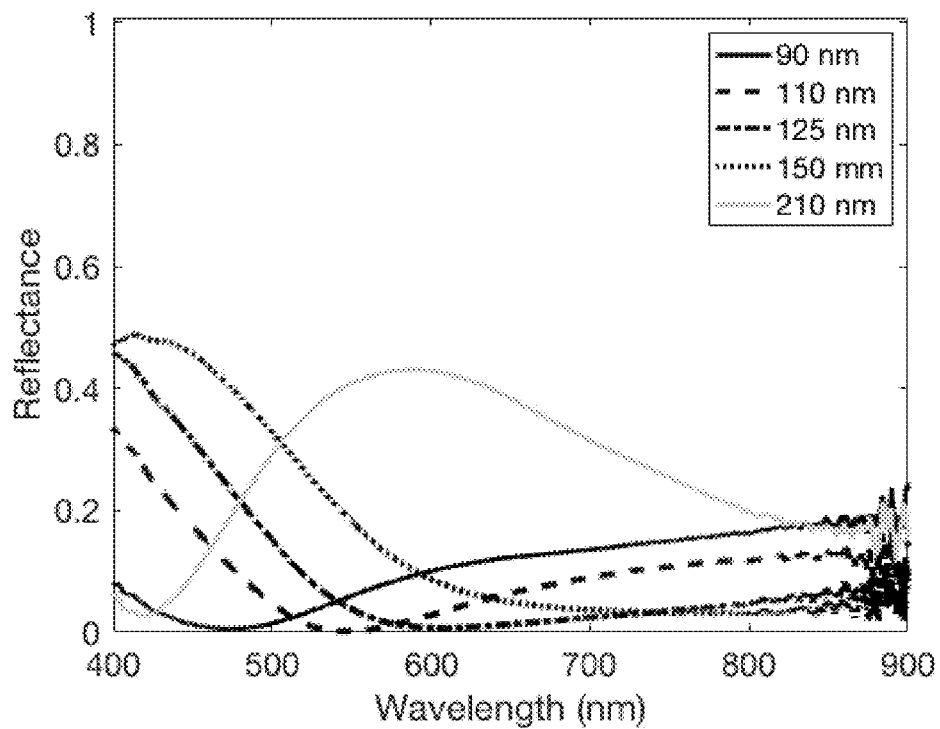
FIG. 11 is reflection spectra of five example sensors with different middle layer thicknesses and a silicon base layer according to the present subject matter

The color reflected from the MIS example sensors based upon the thickness of the middle layer 6 was explored. Example sensors with PMMA middle layers 6 ranging from 90 nm to 210 nm were prepared on 200 nm Au mirror base layers 4. All example sensors had a 5 nm Au top layer 8. The full MIS sensor stack produced brightly colored surfaces. FIG. 11 shows the measured reflection spectra for each example MIS sensor. FIG. 22 shows pictures of actual MIS sensors in order of middle layer thickness in the bottom row, from left to right, of 90 nm, 110 nm, 125 nm, 150 nm, and 210 nm in air, and FIG. 23 shows the same MIS sensors in the same order, but in ethanol. As can be seen between FIGS. 22 and 23, and as indicated therein, the appearance to the naked eye changes based on the environment in which the MIS sensor is placed.

Figure 14:
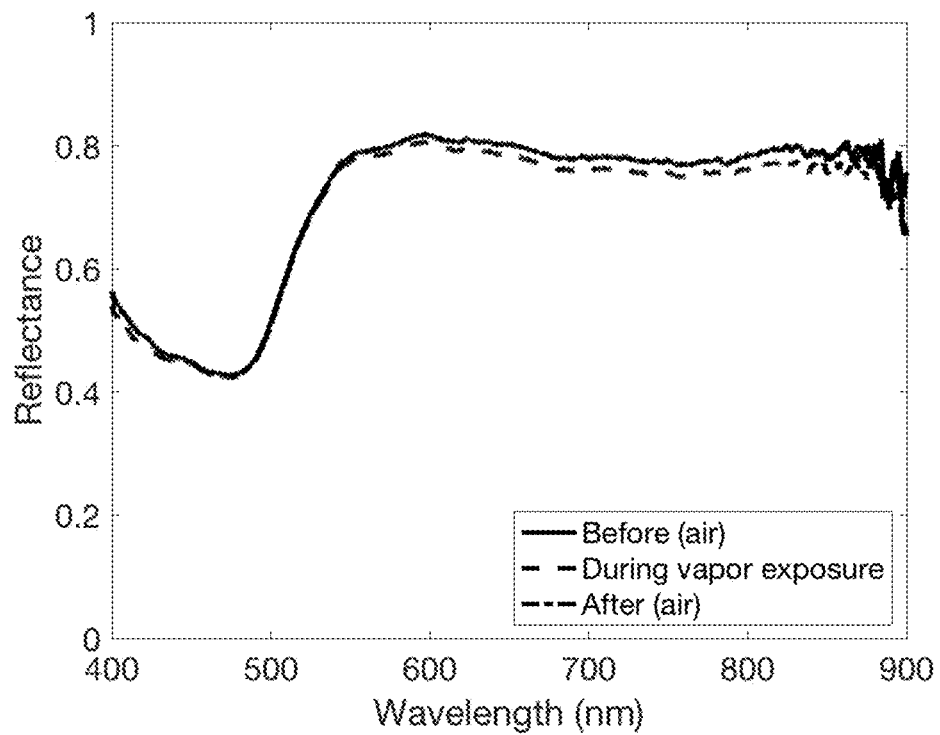
FIG. 14 is reflection spectra taken on a background part of the example sensor used for FIG. 12 without a metal top layer.
Figure 17:
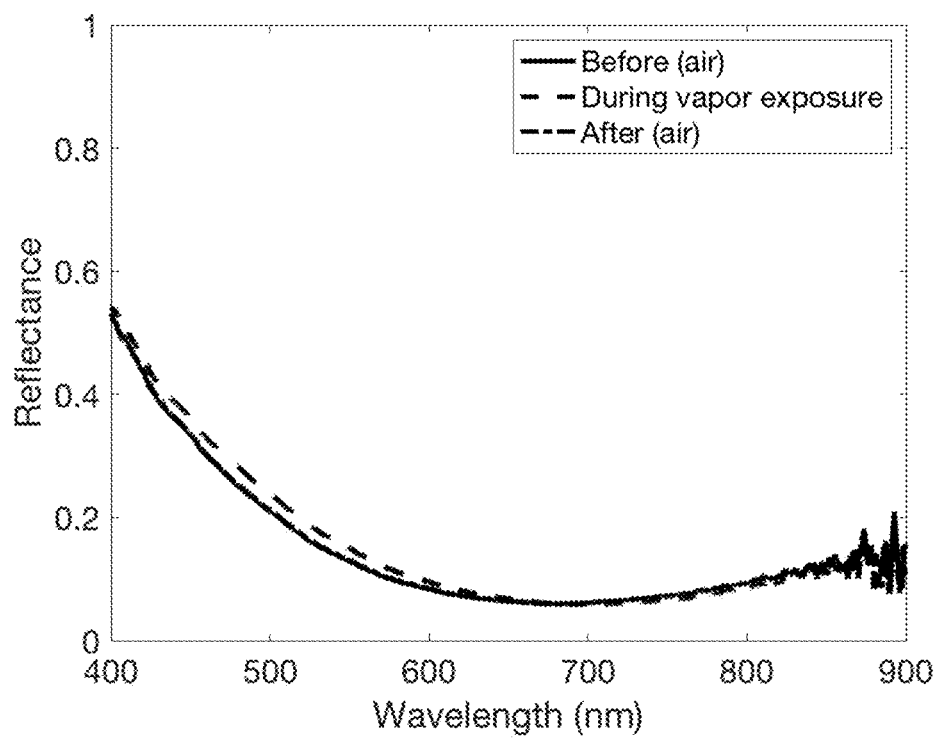
FIG. 17 is reflection spectra taken on a background part of the example sensor used for FIG. 15 without a metal top layer.

As indicated in the figures, there was a particularly strong interplay between the top and bottom metal layers 4, 8, thus producing brightly colored MIM and MIS sensors. In contrast, varying the middle layer thickness without having a top layer present (i.e., in an IM or IS stack; FIGS. 14 and 17, respectively) does not produce a significant change in color (shift in resonance). This highlights the role of the resonant cavity of the middle layer 6 as formed by the presence of the top layer 8, in amplifying changes in the color due to changes in middle layer thickness. It also suggests that by itself, the ca. 100 nm thick PMMA middle layer is too thin to add the phase required for perfect absorption.

Based on the MIM static middle layer thickness characterization in FIG. 10, there was a focus on middle layer thicknesses in the range of 115 nm to 145 nm for sensor operation when exposed to saturated ethanol vapors ($P_{sat}$ approximately at 5% $P_{atm}$), producing the maximum possible expansion of the middle layer 6. The example sensors had a 5 nm thick gold film top layer, 115 nm thick PMMA middle layer, and 200 nm thick gold mirror base layer. These example sensors were tested by the following steps: (i) the sensor baseline spectra were measured in air, (ii) the sensor was placed in a closed, vapor-saturated environment and allowed to equilibrate, and (iii) the sensor was removed from the vapors and allowed to equilibrate once again in air. Equilibrium times were observed to be as fast as approximately 30 seconds for uptake of vapor; and less than 1 second for vapor release, and the process was fully reversible. The optical path was the same for each measurement above, and three spectra were taken in each region of interest on the sensors, one area being the IM (or IS) section without the nanoisland top layer, and another area being the MIM (or MIS) section with nanoisland top layer. These multiple measurements were done to account for any inhomogeneity of the fabricated example sensors. Despite the example sensors being made up of disordered nanoislands, the measured spectra were remarkably uniform, likely because of the significant nanoparticle ensemble averaging over the relatively large (i.e., greater than 100×100 μm$^2$) microscope field of view.

Figure 12:
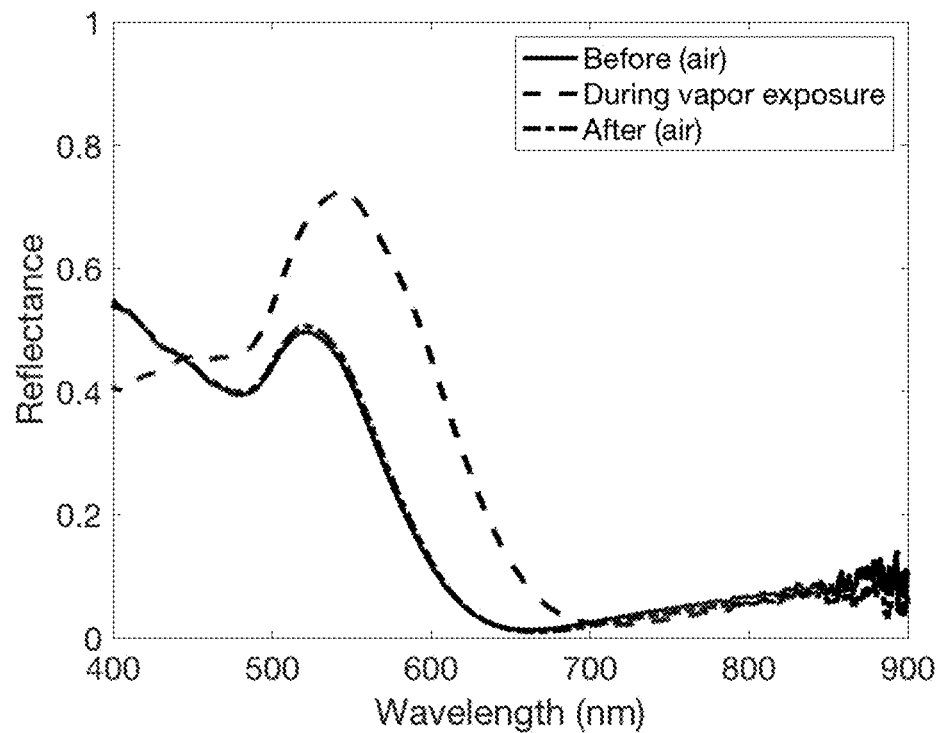
FIG. 12 is reflection spectra of an example sensor with a gold base layer taken in air and in an ethanol environment according to the present subject matter.
Figure 13:
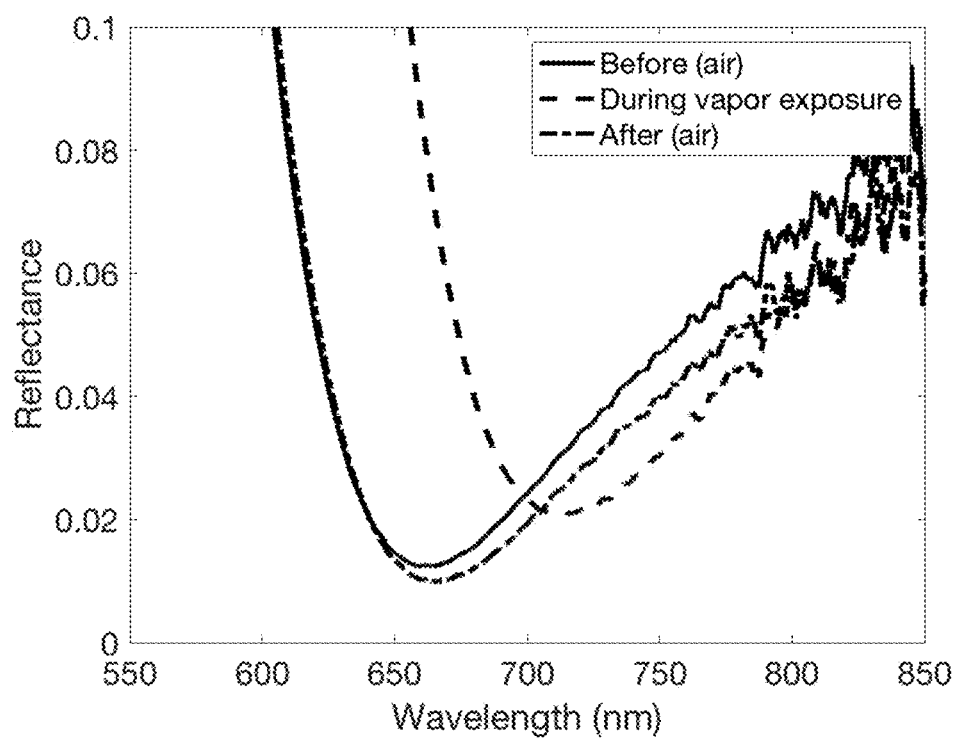
FIG. 13 is a detailed portion of the reflection spectra of FIG. 12.

The spectra results for the MIM and MIS vapor detection experiments are shown in FIGS. 12-14. Spectra were recorded for both the IM (or IS) region (i.e., "background" with no gold top layer, FIG. 14), and for the MIM (or MIS) region (i.e., including the gold top layer, FIGS. 12-13). In each case, the spectra before, during, and after ethanol exposure were recorded. In response to the ethanol vapor there is a large (approximately 68%) increase in peak intensity $I_{550nm}$, as well as a shift of the resonance dip $\Delta\lambda_{dip}$=47 nm. There was a clear shift in visible color reflected from the MIM and MIS regions as recorded by a CCD camera coupled to the microscope: for the MIM sensor, the color shift was from bluish-green in air, to yellowish-green in ethanol (EtOH); for the MIS sensor the color shift was from magenta in air, to deep blue in ethanol (EtOH). The IM and IS regions did not change perceptibly in the CCD images, yet a small change is seen in the spectra (FIGS. 14 and 17). This further illustrates the role of broadband absorption and corresponding phase shifts in the full MIM (or MIS) stack in producing the unique optical properties. Next, a calibration curve for the reflected intensity at wavelength λ=550 nm ($I_{550nm}$) derived from the static MIM sample characterization in FIG. 10 was applied to estimate the change in middle layer thickness in response to the saturated EtOH vapors. According to this calibration curve, given the observed 68% increase in peak reflection intensity $I_{550nm}$, the increase in middle layer thickness d was estimated to be 15 nm. Note that change in refractive index n was assumed to be negligible here, in accordance with literature.

Figure 15:
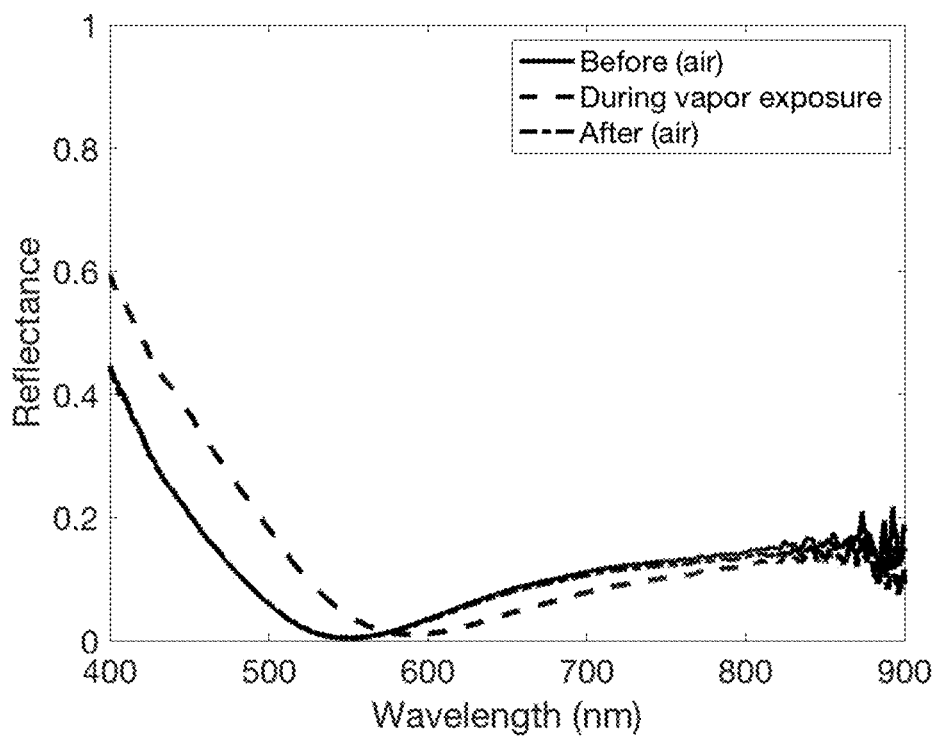
FIG. 15 is reflection spectra of an example sensor with a silicon wafer base layer taken in air and in an ethanol environment according to the present subject matter.
Figure 16:
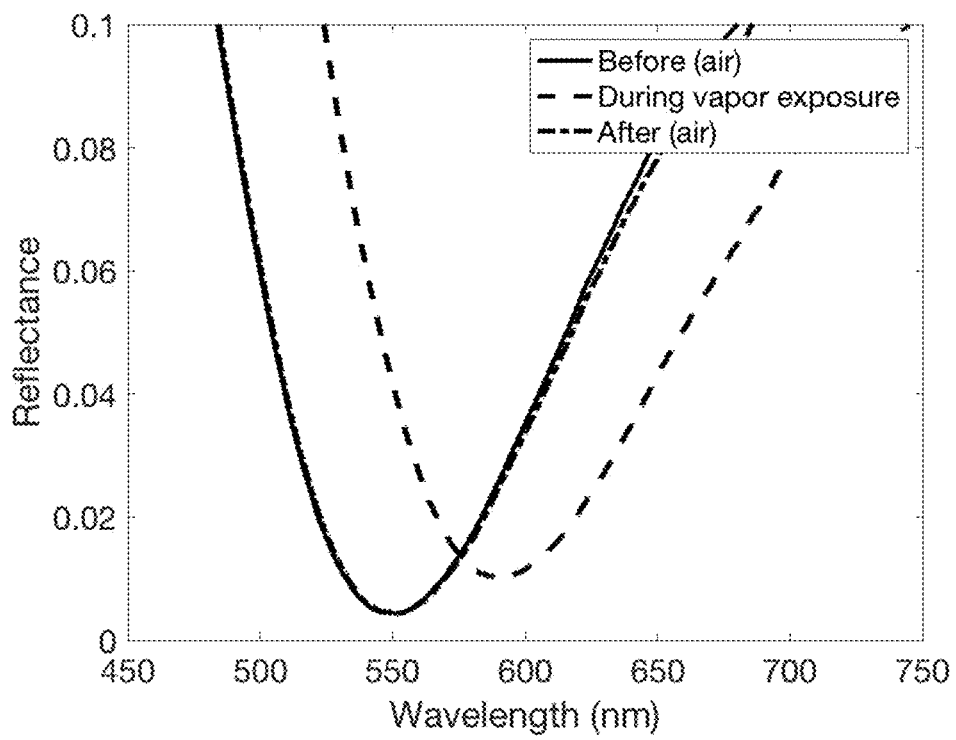
FIG. 16 is a detailed portion of the reflection spectra of FIG. 15.

In order to explore the role of material properties, we repeated the same experiment with a different base layer 4, using silicon instead of gold, resulting in a metal-insulator-semiconductor (MIS) structure. Spectra were recorded for both the IS region (i.e., "background" with no gold top layer, FIG. 17), and for the MIS region (i.e., including the gold top layer, FIGS. 15-16). In each case, the spectra before, during, and after ethanol exposure were recorded. All other sensor parameters remained fixed. The observed color shift was larger for the MIS device compared to the MIM device, which may be related to the better-defined absorption resonance features shown in FIGS. 15-16. All other experimental conditions were equal; therefore, the color shift here may also be interpreted in response to a 15 nm change in middle layer thickness. All vapor sensing experimental results were well-matched to simulations based on changing spacer the thickness by 15 nm (not shown here), thus strengthening confidence in the assumption that spacer thickness is the primary driver in the color shifts (and not refractive index).

Since both sensors (MIM and MIS) were identical other than the reflector material in the base layer 4, the different optical responses are related to the different phase shifts imparted on the reflected wave and the resulting interference with the incident light. These results indicate that adjusting the reflector material properties of the base layer 4 to engineer the phase of the reflected wave, provides another mechanism to optimize the colorimetric sensor response.

Figure 18:
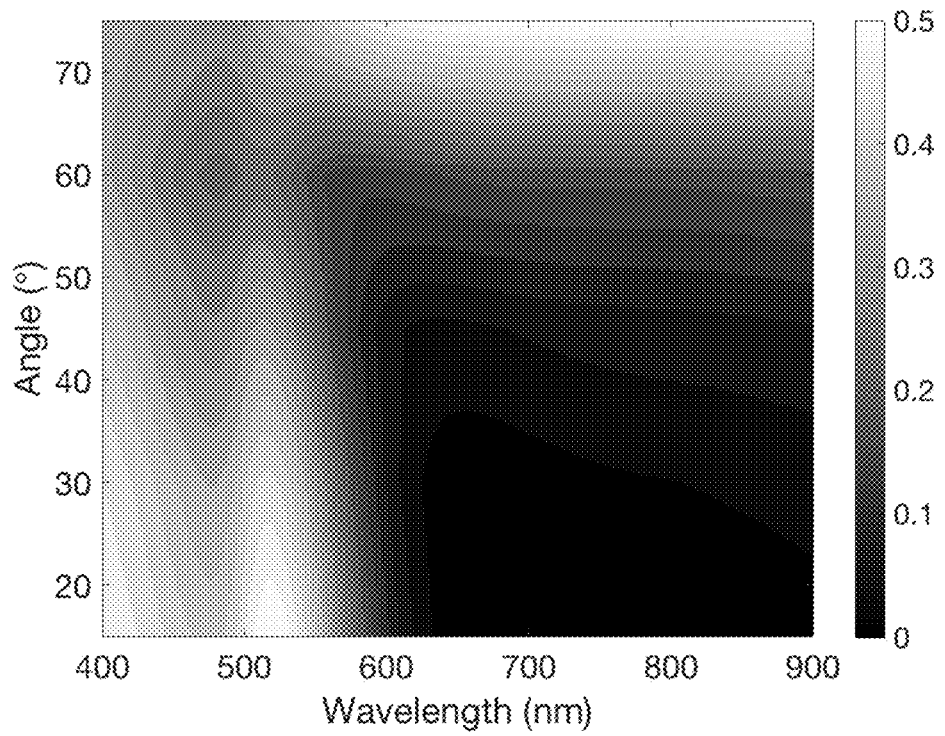
FIG. 18 is a two-dimensional map of the reflectance as a function of the angle and the wavelength of incident light of an example MIM sensor according to the present subject matter.
Figure 19:
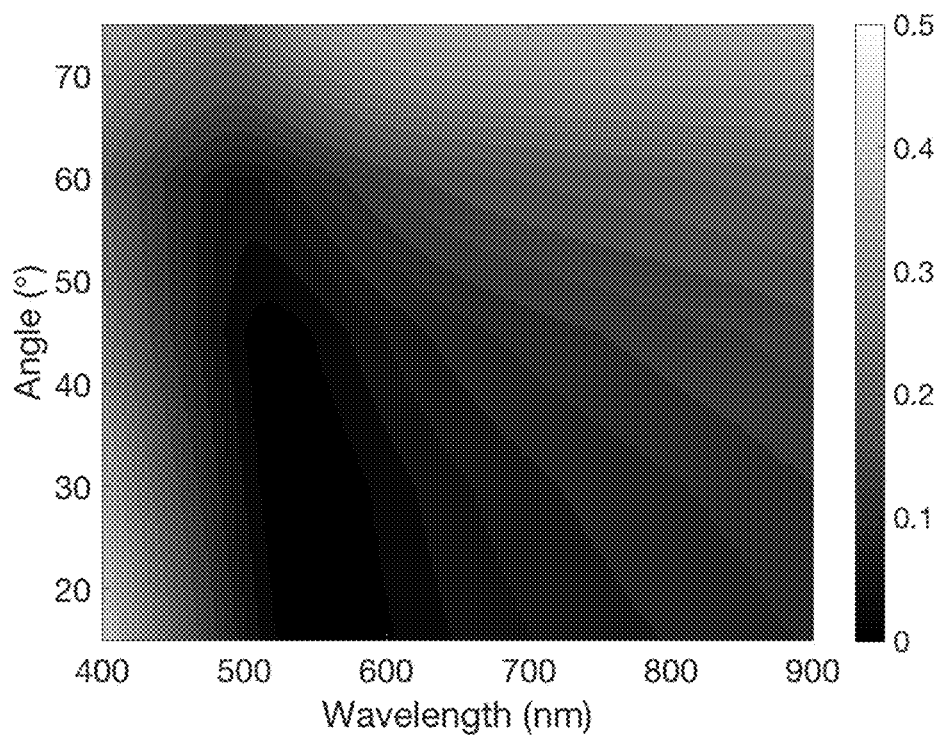
FIG. 19 is a two-dimensional map of the reflectance vs. the angle and the wavelength of incident light of an example MIS example sensor according to the present subject matter.

It was also found the MIM and MIS example sensors were insensitive to the angle and wavelength of the incident light; i.e., they are iridescence-free. This is relevant for the colorimetric sensor application, as a change in color based on angle or wavelength could be mistaken for a stimulus-induced change in middle layer thickness; it is also relevant in display applications, which also require stable operation over wide viewing angles. To characterize the angular and wavelength independence, the example sensors were measured using variable angle spectroscopic ellipsometry. As shown in FIG. 18, in which a MIM sensor was used, and FIG. 19, in which a MIS sensor was used, the two-dimensional (2D) maps show the experimentally measured average (i.e., unpolarized) reflectance (in gray scale) as a function of angle and wavelength of the incident light. Both MIM and MIS examples shown here have a 115 nm PMMA middle layer and a 5 nm Au nanoisland top layer, and thus only differ in bottom layer material. The example sensors were measured using J.A. Woollam V-VASE® ellipsometer at 5 different angles: 15°, 30°, 45°, 60°, and 75°. Linear interpolation was used to smooth 2D plots with excellent agreement to simulation. The perceived color is strongly dependent on the absorption band (i.e., reflection dip) wavelength. However, the perceived color does not change significantly with the angle. The 2D maps show that the dark absorption bands have minimal wavelength dependence as a function of angle (up to approximately 60°).

Figure 20:
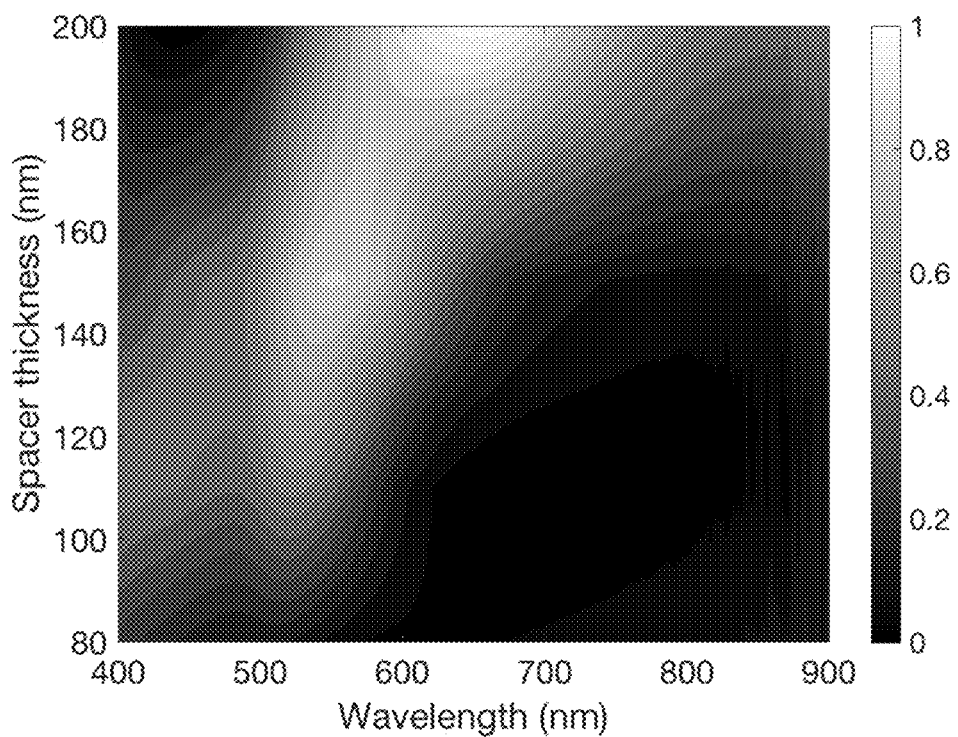
FIG. 20 is a two-dimensional map of the reflectance vs. the middle layer thickness of an example MIM example sensor according to the present subject matter.
Figure 21:
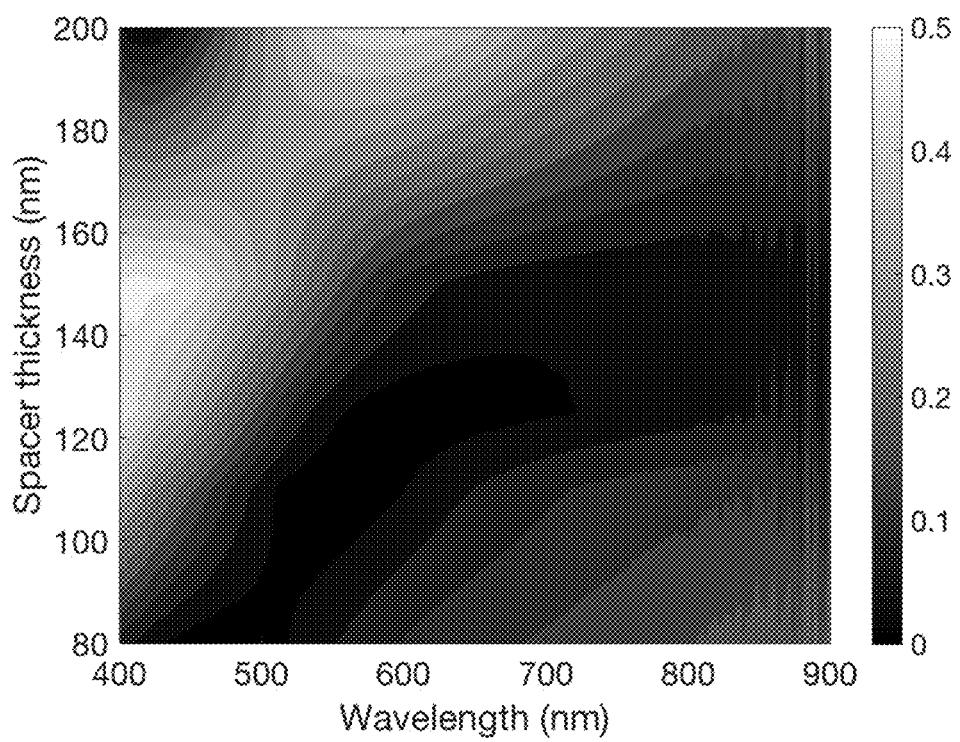
FIG. 21 is a two-dimensional maps of the reflectance vs. the middle layer thickness of an example MIS example sensor according to the present subject matter.

As shown in FIG. 20, in which a MIM sensor was used, and FIG. 21, in which a MIS sensor was used, the 2D maps show the experimentally measured reflectance (in gray scale) as a function of middle layer thickness and wavelength. Both MIM and MIS examples have a 5 nm Au nanoisland top layer, and a middle layer with five different thicknesses corresponding to those used in FIGS. 10 and 11, respectively. The samples were measured at normal incidence using a reflection geometry microspectrometer. The absorption bands can be seen to shift towards longer wavelengths with increasing spacer thickness (producing a diagonal 'up & to the right' pattern); this contributes to the perceived color change with increasing spacer thickness.

These example sensors demonstrate the design, theory and fabrication of large-area, actively tunable asymmetric Fabry-Perot cavity structures. Specifically, the sensitive and fully reversible response of sensors based on an active polymer spacer layer were demonstrated. Upon exposure to ethanol vapors at saturation, the polymer middle layer swelled up by 15 nm in thickness, producing an obvious naked-eye detectable shift in color. We tested two geometries: a gold reflector-based sensor and a silicon reflector-based sensor. The silicon-based sensor produced a greater color shift compared to gold, due to the different material dispersion relations and phase shifts imparted at the reflector interface. Furthermore, the analytical models studied in this work, and 2D reflectance maps, may provide guidance on engineering the phase relationships in the MIM and MIS structures for optimal colorimetric performance. Importantly for colorimetric sensor applications, the sensors studied here were also shown to be iridescence-free. In conclusion, the unique combination of vibrant reflective (additive) structural colors fabricated via large-area fabrication techniques, combined with a dynamically tunable spacer may be applied to new active, optical/plasmonic devices, with colorimetric far-field signal readout.

As presented herein, the top layer provides broadband absorption which contributes to bright, additive reflective structural colors. These vibrant, reflective structural colors are an improvement over other tunable structures. The bright colors may transduce small changes in other structural parameters (e.g., spacer thickness/optical path length) with greater sensitivity than other devices. The colors also have low angular sensitivity due to broadband absorption. The subwavelength thickness of the middle layer 6 provides enhanced mode field confinement through improved sensitivity, with potential application to light emissions/lasing, and provides less angular sensitivity. The material used in the middle layer 6 may be used in chemical/vapor sensing, novel applications to bio-detection by incorporating bio-recognition elements (e.g., DNA, RNA, etc.), and may be doped with gain media for light emission applications. These benefits available from a single component are uniquely combined to provide bright reflective colors in an asymmetric Fabry-Perot cavity, using a tunable subwavelength spacer, and represent a platform for colorimetric sensing and optical switching/filtering.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A thin-film sensor comprising:
an optically reflective base layer;
a lossy, discontinuous plasmonic metal film top layer arranged over the base layer; and
a stimulus-responsive dielectric film middle layer arranged between the base layer and the top layer, having an optical path length, and configured such that when the middle layer is exposed to a stimulus, the optical path length reversibly changes to produce a reversible change in a color of light reflected from the sensor that is visible to a naked eye of an observer,
wherein the top layer is at or near a percolation threshold.

2. The thin-film sensor according to claim 1, wherein:
the optical path length is a product of a dimension of the middle layer and a refractive index of the middle layer;
the dimension is a thickness of the middle layer; and
a change in the optical path length includes a change in the thickness of the middle layer, a change in the refractive index of the middle layer, or a combination thereof.

3. The thin-film sensor according to claim 1, wherein the top layer is lossy, plasmonic nanoisland film.

4. The thin-film sensor according to claim 3, wherein the top layer includes a disordered array of metal nanoislands or nanoparticles separated by nanometer-sized gaps.

5. The thin-film sensor according to claim 4, wherein the change in the dimension of the middle layer produces a change in a distance between the metal nanoislands or nanoparticles.

6. The thin-film sensor according to claim 1, wherein the stimulus is a chemical.

7. The thin-film sensor according to claim 6, wherein the chemical is an organic solvent.

8. The thin-film sensor according to claim 7, wherein the middle layer is an asymmetric Fabry-Perot cavity, has a thickness of 80 nm to 210 nm when not exposed to the stimulus, and includes poly(methyl methacrylate) that is soluble in the organic solvent.

9. The thin-film sensor according to claim 1, wherein the top layer includes gold and has a thickness of 3-20 nm.

10. The thin-film sensor according to claim 1, wherein the base layer includes a metal film or a semiconductor.

11. The thin-film sensor according to claim 1, wherein the base layer comprises a sputtered metal film on a semiconductor.

12. The thin-film sensor according to claim 1, wherein the top layer is a metal fractal nanoisland structure.

13. The thin-film sensor according to claim 1, wherein the top layer is a vapor deposition layer.

* * * * *